INVENTOR.
Robert D. Brooks though the practice of this invention is subject to a variety of modifications and variations, it is suited for use with boiling nuclear reactors of the type using a fluid moderator and coolant, and is particularly described in this connection.

3,042,600
REACTOR CONTROL
Robert D. Brooks, Ballston Lake, N.Y., assignor to General Electric Company, a corporation of New York
Filed Nov. 28, 1956, Ser. No. 624,931
11 Claims. (Cl. 204—193.2)

This invention relates to a method and apparatus for controlling nuclear reactors. While the practice of this invention is subject to a variety of modifications and variations, it is suited for use with boiling nuclear reactors of the type using a fluid moderator and coolant, and is particularly described in this connection.

A boiling nuclear reactor customarily comprises a reactor pressure vessel within which there is generally included nuclear fuel, a coolant, and a moderator. In a heterogeneous reactor, which is the type described here, the nuclear fuel is positioned in a reactor core in a plurality of rods or plates called fuel elements which are surrounded by a moderating coolant. At least a portion of the coolant is converted into vapor within the reactor core. The coolant, in addition to absorbing heat, also operates as a moderator in that it slows down the neutrons produced by the nuclear reaction to increase the probability of occurrence of a fission reaction.

A moderating coolant may be for example, light water, heavy water, an organic fluid such as diphenyl, or ortho, meta, or para-terphenyl, or a mixture of isomeric terphenyls, or any other fluid having suitable physical characteristics as both a moderator and a coolant. In the type of nuclear power system particularly described, the vapor of the moderating coolant is caused to flow from the reactor to a prime mover. For example, the moderating coolant may consist of light water and may be used to provide steam to drive a stem turbine.

For a more complete discussion of boiling reactors and their theory of operation, reference is made to the article by S. Untermyer, II, in Nucleonics, volume 12, No. 7, July 1954, pages 43 to 47.

In the region of the reactor core of a boiling reactor, the moderating coolant has both a liquid and a vapor fraction. The moderator to fuel ratio in a reactor determines reactivity and the tolerable range of such ratio is established by the reactor design. The boiling moderating coolant has a number of vapor bubbles dispersed in it. The ratio of these moderating coolant vapor bubbles to liquid state coolant may be referred to as the void fraction. Due to decreased moderation by the vapor bubbles, which have a density which is less than liquid state moderator, the moderator to fuel ratio is decreased as boiling increases.

A boiling water reactor using light water as a moderating coolant can be designed so that the boiling or vaporization of the water during operation decreases the reactivity as the coolant is expelled from the reactor by the formation of steam. This has the advantage of promoting reactor stability since as the power of the reactor exceeds desired limits, the formation of vapor bubbles will be such that the amount of moderator in the reactor core decreases. Thus, the reactor tends to shut down due to a decrease in reactivity. Such a reactor is said to be self-regulating and to have a void coefficient of reactivity which is negative; i.e., an increase in void content decreases the reactor multiplication factor or reactivity. This invention is described in connection with this type of boiling reactor.

In a typical reactor of this type, the maximum decrease in reactivity that can be tolerated within the operating range of the reactor may be of the order of 3 percent. Since the power output o fthe boiling reactor is determined by the flow of vapor produced by the reactor, it is desirable to operate such a reactor with a maximum possible vapor fraction.

Under fluctuating loads, load following in a self-regulating reactor is not good, since as the steam demand of this reactor load increases and steam flow from the reactor increases, the reactor pressure tends to fall. At the lower pressure more boiling occurs, creating a greater amount of voids which rapidly reduces the reactor power. Thus, reactor power tends to decrease just at the time that it should be increased to meet increased load demand. Therefore, means must be provided for controlling the reactor reactivity to accommodate changes in load.

A customary method of automatically controlling a nuclear reactor is that of varying the position of neutron absorbing and reflecting control rods, which in turn vary the reactivity of the reactor. However, this method of control generally involves complicated and power consuming apparatus. Thus, it is apparent that it is particularly desirable that a method of control be provided which is suited to control the reactor over a wide range of loads without requiring manipulation of conventional reactor controls.

Therefore, it is an object of this invention to provide improved apparatus and methods for controlling nuclear reactors.

It is an object of this invention to provide apparatus and methods for controlling boiling nuclear reactors in response to reactor load changes.

In accordance with one aspect of this invention, a nuclear reactor, including a volatile moderating fluid coolant and a nuclear chain reacting assembly for heating the coolant for supply to a load, is controlled by regulating the flow of moderating coolant through the reactor in response to the load on the reactor.

Other objects and important aspects of this invention will become apparent from the following portions of the specification and claims taken in connection with the accompanying drawings in which:

Figure 1:
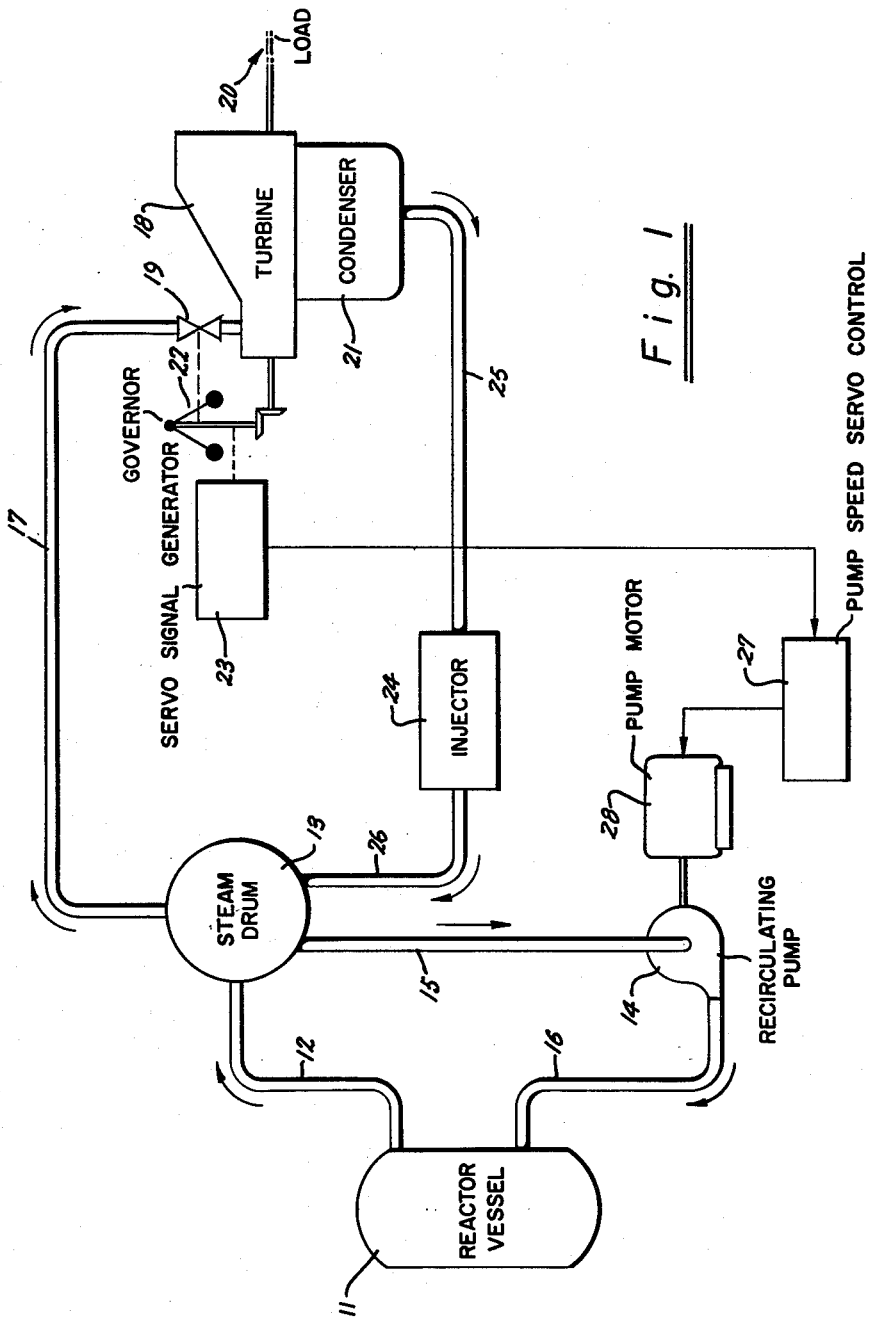
FIGURE 1 is a diagrammatic illustration of one embodiment of the invention.

In FIGURE 1, reactor 11 is a boiling water nuclear reactor used as a power source for a steam turbine power plant. The output of the reactor is connected by suitable piping 12 to steam drum 13 which also serves as a coolant reservoir. Coolant from steam drum 13 is returned to reactor vessel 11 by recirculating pump 14 through pipes 15 and 16. Steam from steam drum 13 flows through suitable piping 17 to turbine apparatus 18 and steam flow is controlled by throttle valve 19. Turbine apparatus 18 supplies the power plant load through shaft 20 and includes condenser 21. Turbine load changes are sensed by governor 22 which actuates throttle valve 19 and servo signal generator 23. Condensate from condenser 21 is returned by injector 24 through suitable piping 25, 26 to steam drum 13. Servo signal generator 23 provides an electrical signal to a suitable response mechanism such as pump speed servo controller 27. The servo controller 27 operates a rheostat or other suitable means to regulate the speed of pump motor 28 in response to the signal generated by servo signal generator 23. The steam drum 13 is located above the level of pump 14 and the level of coolant in reactor 11. This provides sufficient coolant head to prevent reactor burn-up in the event of pump failure.

In order to simplify the description of this invention, details of the reactor such as control rods and other necessary instrumentation have not been illustrated. Also, conventional details of the turbine portion of the power plant are not illustrated. It should be appreciated that the reactor illustrated in FIGURE 1 is started up in a conventional manner, for example, by withdrawing control rods. The general operating level of the reactor is determined by appropriate positioning of the control rods. However, once the general operating level is established, this invention may be practiced to control the reactor over a wide range of loads.

When operating at a constant power level, the steam voids have a substantially constant volume so long as the rate of steam and coolant flow is unchanged. An increase in the rate of coolant flow tends to reduce the number of steam voids since the vapor bubbles or steam voids are swept from the reactor at an increased rate. This reduces the void fraction so that the moderator to fuel ratio is increased thereby tending to increase the reactivity. Increased reactivity tends to increase the void fraction and the available supply of steam. In the reactor illustrated in FIGURE 1, the flow of moderating coolant through the reactor is dependent upon pump speed and convection currents within the moderating coolant. In addition, the number of steam or vapor voids is also affected by the rate of change of the rise rate of vapor bubbles through the coolant. This is sometimes defined as "bubble slip."

Thus, the void fraction of the moderating coolant is generally determined by the rate of flow of moderating coolant through the reactor, assuming, among other factors, that the control rod settings of the reactor are not changed. The relationship between the number of vapor voids and the flow of moderating coolant is the major reactor control factor in the type of system described herein and includes not only forced flow effected by recirculating pump 14 but additional flow through the reactor occurring because of natural convection currents.

As will be apparent from the following description, the operation is such that circulation is maintained in amounts sufficient to give the proper moderator to fuel ratio throughout the reactor core and sustain the reactor power level required by the operating load.

As shown in FIGURE 1, the speed of the pump 14 is responsive to the speed of the turbine by the action of the governor 22 and servo signal generator 23. In normal operation, as the load demand on the turbine is increased, turbine speed commences to decrease until more steam is produced and delivered to the turbine. At the same time, the servo signal generator 23 causes a responsive speed increase in the pump 14 and an increase in the rate of flow of the moderating coolant through the reactor. By simultaneously increasing flow through the reactor, more steam is pushed out of the reactor, the void fraction is reduced, and the reactivity of the reactor is increased. The reactor then operates at an increased power level and produces more steam to meet the increased load demand placed upon the turbine.

Similarly, if the load demand on the turbine is decreased, the turbine tends to speed up until there is a decrease in steam flow to the turbine. Simultaneously, the servo signal generator 23 gives a signal to the pump speed servo control 27 reducing the flow of moderating coolant through the reactor, and steam flow to the turbine is decreased because the flow of moderating coolant through the reactor is reduced. Because of the decrease in flow, the void fraction is decreased, reducing the reactivity of the reactor.

In one typical example, assume reactor 11 is operating at maximum reactivity and the recirculating pump 14 is pumping and recirculating water at a rate such that the volume of steam within the reactor is 20 percent of the total fluid volume. Control rod settings are such that the reactivity of the reactor is at a steady state.

A change in load on the turbine causes a change in the speed of the pump such that the recirculating water flow is reduced to 80 percent of its previous flow. Steam is still being formed at the full reactivity rate because a change in the moderator to fuel ratio has not yet occurred and the control rod settings have not been changed. However, steam flow from the reactor is at a lower rate because of the lowered steam demand by the turbine. Thus, the steam value within the reactor tends to increase and the water volume decrease. The resulting reduction in the ratio of moderator to nuclear fuel causes the reactivity of the reactor to decrease until the rate of steam formation is such that a 20 percent steam volume condition in the reactor is again reached. This stable condition has a power level of 80 percent.

If it is assumed that a subsequent load change increases the steam flow to one hundred percent, momentarily the steam will flow out of the reactor faster than it can be formed and the steam volume will drop below 20 percent. The pump speed will increase so that the water volume within the reactor tends to increase to greater than 80 percent with a consequent increase in the ratio of moderator to nuclear fuel. Reactivity increases until a stable condition is again reached at full power level.

Figure 2:
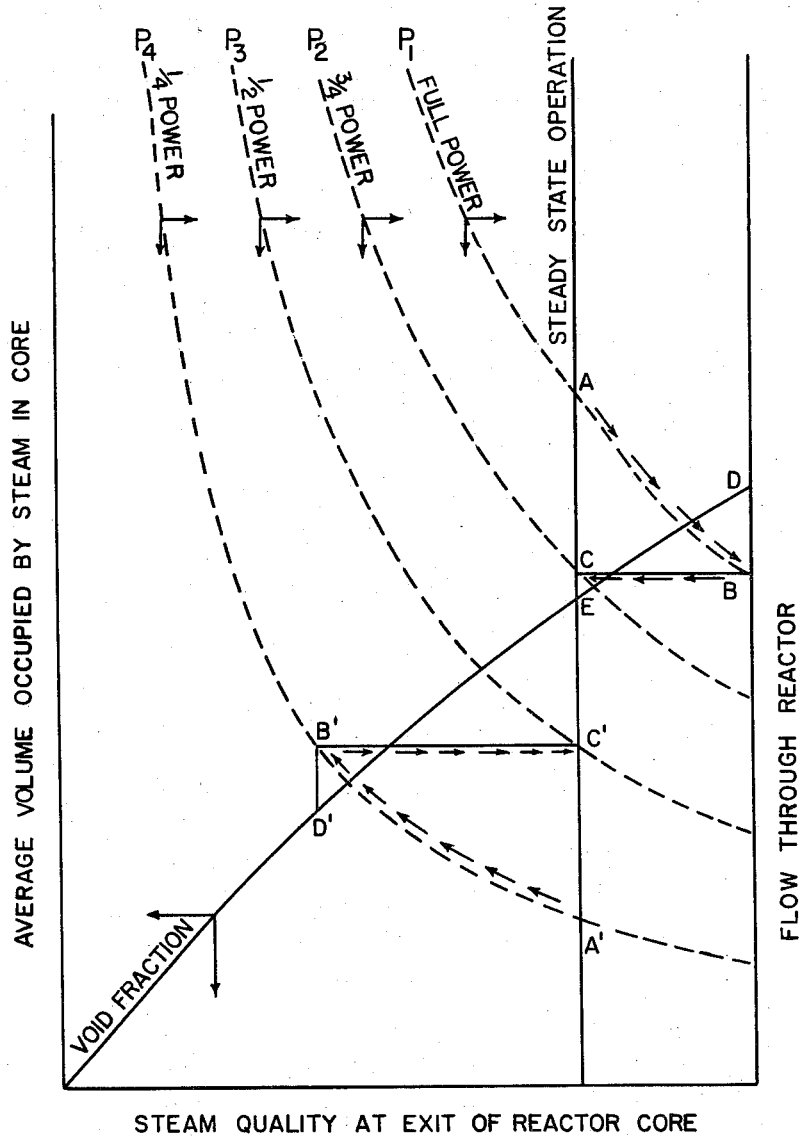
FIGURE 2 is a graphical representation of the control of a boiling reactor in accordance with this invention.

FIGURE 2 is referred to in describing graphically the control of a boiling reactor in accordance with this invention. This figure illustrates a plot of the effect of forced circulation of moderating coolant on reactor power level and relates forced circulation to the average volume occupied by steam in the reactor core and the quality of steam leaving the core. It is assumed in plotting these curves that the ratio of steam velocity to water velocity through the core is constant throughout the operation of the reactor at power levels of one-quarter, one-half, three-quarters, and full power Dashed curves $P_1$, $P_2$, $P_3$, and $P_4$ plot the relationship between rate of coolant flow through the reactor against the quality of steam leaving the reactor core at four specific power levels. The solid curve labeled void fraction is a plot of void fraction in the reactor core as a function of the quality of the steam leaving the core. It will be noted that at constant reactor power level, as moderating coolant flow is decreased, the steam quality increases.

It is assumed that the control rod settings remain unchanged during changes in load demand between one-quarter power and full power. Also, for steady state operation, the void content of the reactor core must remain substantially constant independent of load. With these assumptions, a plot of steam quality for steady state operation becomes the vertical line labeled "steady state operation."

By way of example, assume that it is desired to reduce the reactor power. The corresponding void content is indicated by point E at the intersection of the void fraction curve and the steady state operation line.

To go from full power conditions indicated by point A to the three-quarter power condition indicated by point C, the reactor coolant flow is lowered to that indicated by point B and held there. The coolant flow change is sufficiently rapid so that initially the reactor power remains at full power and one moves along the curve, $P_1$ from A to B. At a coolant flow rate indicated by point B, the void content in the reactor core is given by point D. It will be noted that the void content has increased. The reactor power then decreases until the reactor void content becomes equal to that designated by the point E. One then moves along a horizontal line of decreasing steam quality from B to the new operating condition designated by point C.

Now assume that the reactor power is to be increased from one-quarter to one-half of rated load. Initially, the reactor coolant flow and steam quality is given by point A' while the reactor void content is indicated by point E. To increase the reactor power, the coolant circulation rate is increased to that designated by point B' and held there. The flow changes sufficiently rapidly so that initially the reactor power remains at one-quarter and one moves along curve $P_4$ from A' to B'. When the point B' is reached, the reactor void content is represented by D'; i.e., the void content has decreased. The decrease in reactor void content results in an increase in reactor power until the reactor void content equals that of point E. One moves, therefore, along a horizontal line of increasing steam quality from B' to the new operating condition designated by point C'.

It should be pointed out that the foregoing method for control of a rector may not provide control over the total reactivity range of the reactor for the reason that there is a certain amount of flow due to convection currents in the fluid. These convection currents are sometimes termed the thermal head in a circulating system and contribute a certain amount of upward flow through the reactor core due to the temperature differential of the fluid. The magnitude of such convection currents or thermal head is a function of the plant design and depends in part on the height of the reactor core, the height of the liquid-vapor interface above the center of heat generation in the reactor core, in this embodiment the height of the steam drum above the reactor vessel, and the size of the passages through the reactor core. To some degree, this thermal head counter-balances the frictional losses of flow through the reactor core.

In designing a reactor, one inherent factor to be considered is that because of mal-functioning of a pump there may be no flow through the reactor core. If there is no flow through the reactor core, before the reactivity subsides, the fuel elements in other parts of the reactor core may become so hot that they will melt or rupture because there is not adequate heat transfer from those elements. Accordingly, and as is shown in FIGURE 1, the steam drum is placed at an elevation above that of the reactor so that a certain amount of flow from the steam drum through the reactor core takes place by natural circulation. In a particular design the convection flow or thermal head may be such that approximately 25 percent of the flow of moderating coolant through the reactor will result therefrom. This tends to limit reactor control to approximately 75 percent of the power range over which the reactor theoretically can be controlled by the recirculating pump. In such situations, a valve may be used to control flow of moderating coolant through the reactor in the range wherein that flow is due to convection currents or thermal head alone.

Figure 3:
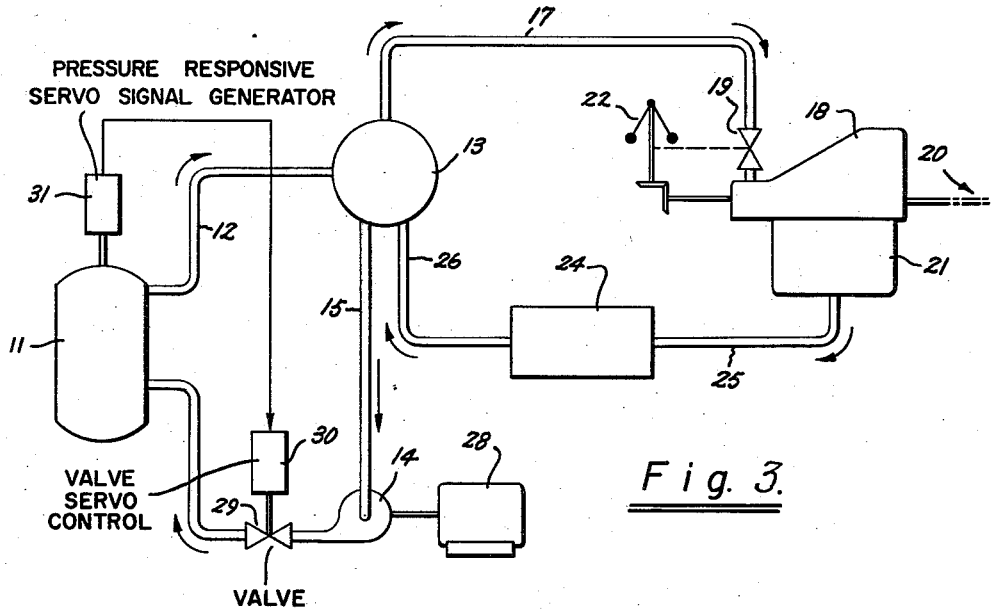
FIGURE 3 is a diagrammatic illustration of another embodiment of the invention.

As is shown in FIGURE 3, moderating coolant water is recirculated by pump 14 operating at a constant speed. Flow is controlled by the valve 29 positioned in the line between the pump 14 and the reactor 11. Valve 29 is actuated responsive to reactor pressure by means of the servo valve control 30 which is responsive to the electrical signal received from the pressure responsive servo signal generator 31. Changes in load demand produce an almost simultaneous change in the pressure in the reactor 11, because as the load demand increases, governor 22 moves throttle valve 19 toward a more open position and greater steam flow is delivered to the turbine 18 causing a drop in the pressure in steam drum 13 and in the connected reactor 11. A decrease in steam pressure causes the pressure responsive servo signal generator 31 to operate valve servo control 30 to open valve 29 producing a greater flow of moderating coolant through the reactor which, as previously explained, increases reactor reactivity and meets the increased load change. When an increased steam flow rate sufficient to sustain the increased load is reached, the normal operating pressure of the reactor 11 is maintained at an increased reactivity level because further increase in reactor pressure causes a resultant closing of valve 29 to reduce flow of moderating coolant. Valve 29 regulates not only the flow caused by the recirculating pump 14, but also the flow resulting from the thermal head or convection flow from the system.

Figure 4:
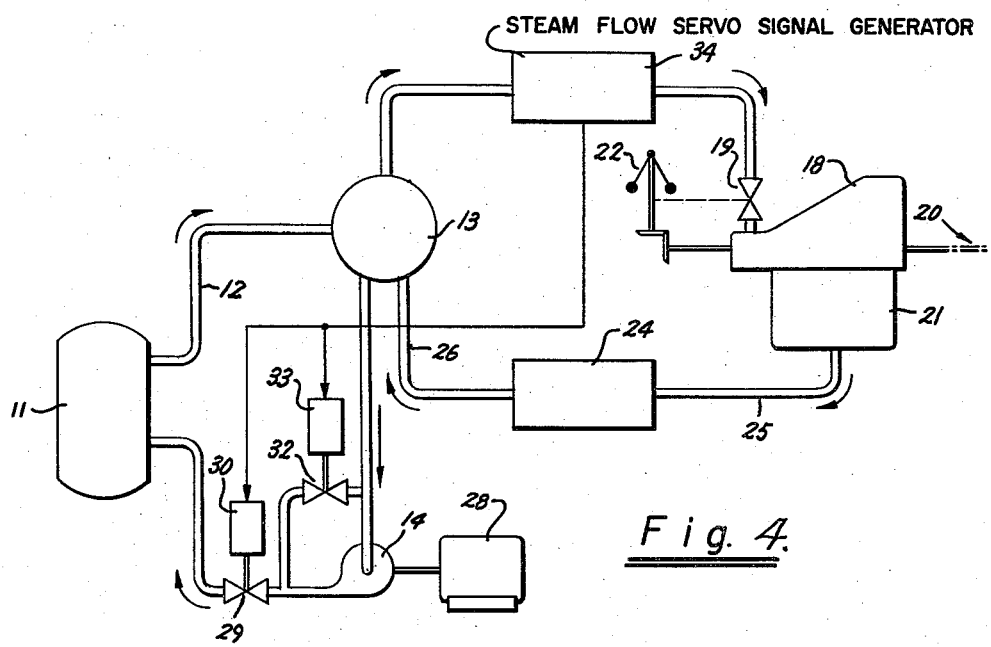
FIGURE 4 is a diagrammatic illustration of another embodiment of the invention.

In the embodiment shown in FIGURE 4, additional means are provided for controlling flow of moderating coolant through the reactor by means of a by-pass valve 32 which operates in conjunction with valve 29. Valve 32 controls by-pass flow around the pump 14 operated at constant speed. Valve 32 is actuated by valve servo control 33 which is arranged to operate in an opposite direction to the operation of valve servo control 30 which actuates valve 29. Both valve servo controls 33 and 30 are responsive to the signal generated by steam flow servo signal generator 34, which signal is proportional to the rate of steam flow from the steam drum 13 to the turbine 18. As load demand on turbine 18 is increased, the steam flow to the turbine is increased by the opening of throttle valve 19 in response to the action of governor 22. This increased steam flow causes steam flow servo generator 34 to actuate valve servo control 33 to move valve 32 toward a closed position and at the same time actuate valve servo control 30 to move valve 29 toward an open position with an over-all result that there is a greater flow of moderating coolant through the reactor. As previously explained, this increases the reactivity of the reactor to meet the increased load demand. In the range of low load demand on the system, the operation of valves 29 and 32 is such that the recirculating pump 14 is by-passed. Thus, with recirculating pump 13 not operating, the flow of moderating coolant depends entirely upon the natural convection flow from the steam drum 13 to the reactor 11.

In applying this invention to the control of any particular reactor, it will be necessary to adjust the relationship between moderating coolant flow into the reactor and the change in load demand to meet the requirements of the particular reactor design. As has been previously described, the length of the reactor core and the size of the flow passages through the core affect not only the convection current or thermal head, but also determine the effect of rise rate of bubbles through the liquid or "bubble slip."

If there is a substantial amount of "bubble slip," then the amount of flow into the reactor need not be as great in order to achieve the same result. For instance, if it is assumed that "bubble slip" is directly proportional to water velocity and has a velocity of 1.15 times that of water velocity, then the flow through the reactor can be reduced by this factor of 1.15. In other cases, the "bubble slip" may have a constant value regardless of the rate of fluid flow. In those cases it may be necessary to provide some type of integrating means to accommodate this constant value which is not in proportion to the rate of fluid flow.

Depending upon the type of reactor design, both for convenience and in order to obtain the most prompt and accurate response to load changes, the control of rate of flow of moderating coolant through the reactor may, for example, be responsive to either the speed of the turbine, as illustrated in the embodiment shown in FIGURE 1, the pressure in the reactor vessel, as in FIGURE 3, or the pressure in the steam drum itself, not illustrated, or the steam flow from the reactor vessel, as in FIGURE 4, or a combination of any or all of the same. It is apparent that the control system of the invention may incorporate a variety of mechanical linkages and servo mechanisms to accomplish the required relationship between load and rate of flow of moderating coolant without departing from the spirit of this invention.

The specific embodiments described herein are presented merely as examples of the many forms the practice of this invention may take. It will be apparent to those skilled in the art that the practice of this invention may be carried out with a wide variety of apparatus. Therefore, it is intended in the appended claims to cover all modifications and variations that come within the true spirit and scope of this invention.

What is claimed is:

1. An apparatus which comprises a nuclear reactor adapted to contact a liquid moderator-coolant with a nuclear chain reacting assembly, means for controlling said assembly to heat and partially vaporize said coolant, separator means for separating the vapor and liquid portions of the heated coolant discharged from said assembly, an energy extracting load means connected in vapor-receiving relation to said separator means, means for returning said liquid portion to said reactor, detecting means sensitive to changes in power demand on said load means, and means responsive to said detecting means and connected to increase the flow of liquid moderator-coolant through chain reacting assembly in response to increased load demand and to decrease the flow of liquid moderator-coolant through said chain reacting assembly in response to decreased load demand to regulate the power output thereof to meet and follow operational changes in the power demand by varying the ratio between said vapor and liquid portions of said moderator coolant therein.

2. An apparatus according to claim 1 wherein said last named means comprises a pump connected in liquid delivery relation to said reactor, variable speed drive means for said pump, and a servo signal generator and a pump servo control means connected between said drive means and said detecting means.

3. An apparatus according to claim 1 wherein said last named means comprises a pump connected in liquid delivery relation to said reactor, a control valve connected to vary the flow from said pump to said reactor, and a servo signal generator and a valve servo control means connected between said control valve and said detecting means.

4. An apparatus according to claim 1 wherein said last named means comprises a pump connected in liquid delivery relation to said reactor, a control valve connected between said pump and said reactor, a by-pass valve connected around said pump, and a servo signal generator and a control valve servo control means and a by-pass valve servo control means connected between said valves and said detecting means.

5. An apparatus according to claim 1 wherein said load means comprises a vapor driven mechanical prime mover, and wherein said detecting means comprises means sensitive to the mechanical speed of said prime mover.

6. An apparatus according to claim 1 wherein said detecting means comprises a pressure sensitive means connected to be actuated by the pressure of the coolant vapor portion.

7. An apparatus according to claim 1 wherein said detecting means comprises a vapor flow sensitive means connected to be actuated by the flow rate of the coolant vapor portion being delivered to said load.

8. An apparatus according to claim 1 wherein said moderator-coolant comprises light water.

9. An apparatus according to claim 1 wherein said moderator-coolant comprises heavy water.

10. An apparatus according to claim 1 wherein said moderator-coolant comprises an organic fluid selected from the class consisting of diphenyl, ortho-terphenyl, meta-terphenyl, para-terphenyl, and mixtures thereof.

11. An apparatus which comprises a boiling nuclear reactor including a volatile moderating liquid coolant and a nuclear chain reacting assembly including nuclear fuel, means for controlling said reactor to heat said coolant and vaporize a portion thereof, said assembly having a reactivity which is reduced by expulsion of liquid state coolant therefrom, a load means, a coolant separator reservoir coupled in vapor-liquid receiving relation to said reactor and in vapor delivery relation to the load for supplying vaporized coolant to the load and disposed at an elevation above said assembly, means for returning coolant from the load to the reservoir, means for returning liquid coolant from the reservoir to the reactor, and means responsive to the load demand of said load means on the reactor connected to increase the flow of moderating liquid coolant through said chain reacting assembly in response to increased load demand and to decrease the flow of said moderating liquid coolant through said chain reacting assembly in response to decreases in load demand and thereby control the moderating coolant to nuclear ratio in said assembly and control the reactor reactivity in response to the load on the reactor.

References Cited in the file of this patent

UNITED STATES PATENTS 2,770,591     Wigner _____ Nov. 13, 1956

FOREIGN PATENTS 631,069     Great Britain _____ Oct. 26, 1949

OTHER REFERENCES

Treshow, Design Study of Small Boiling Reactors for Power and Heat Production, ANL-5327 (Del), USAEC document dated Nov. 1954 declassified March 6, 1957, pages 8-11, 27, 57-58, 62-65. (The Nov. 1954 date is relied on.) Copy in Scientific Library and in 204—193.26.

Untermyer, Nucleonics, vol. 13, (July 1955), pages 34-35.

Proceedings of the International Conference on the Peaceful Uses of Atomic Energy, Geneva, August 1955, vol. 3, published by United Nations, New York (1955), pp. 250-252, 254-259.

Le Clair et al.: General Electric Review (Nov. 1955), pages 19-22 (received in the Patent Office Nov. 16, 1955 and this date relied on). Copy in 204—193.3.

Macphee: Nucleonics, vol. 13 (Dec. 1955), pages 42-45. (Adopted from paper presented at second national annual meeting of the IRE Professional Group on Nuclear Science, Sept. 15, 1955, in Oak Ridge, Tenn.)

Nucleonics, vol. 14 (Apr. 1956), pages 106, 108, 109.

Leyse: Nucleonics, vol. 14 (No. 7, July 1956), pp. 42-45.

UNITED STATES PATENT OFFICE
CERTIFICATE OF CORRECTION

Patent No. 3,042,600　　　　　　　　　　　　　　July 3, 1962

Robert D. Brooks

It is hereby certified that error appears in the above numbered patent requiring correction and that the said Letters Patent should read as corrected below.

Column 7, line 11, after "through" insert -- said --; column 8, line 23, after "nuclear" insert -- fuel --.

Signed and sealed this 6th day of November 1962.

(SEAL)
Attest:

RNEST W. SWIDER
Attesting Officer

DAVID L. LADD
Commissioner of Patents